United States Patent [19]

Marker et al.

[11] Patent Number: 5,565,066
[45] Date of Patent: Oct. 15, 1996

[54] SINGLE VESSEL DISTILLATION AND ADSORPTION APPARATUS

[75] Inventors: Terry L. Marker, Warrenville; Santi Kulprathipanja, Inverness; Simon H. Hobbs, Chicago, all of Ill.

[73] Assignee: UOP, Des Plaines, Ill.

[21] Appl. No.: 319,919

[22] Filed: Oct. 7, 1994

[51] Int. Cl.$^6$ ............................ B01D 3/00; B01D 15/00
[52] U.S. Cl. ........................... 202/158; 96/143; 202/173; 202/182; 202/184; 203/41; 203/DIG. 6
[58] Field of Search ...................... 202/158, 173, 202/184, 182, 237; 203/100, 41, DIG. 6, 29; 159/DIG. 28; 210/672, 664; 96/143

[56] References Cited

U.S. PATENT DOCUMENTS

| | | | |
|---|---|---|---|
| 3,122,486 | 2/1964 | Skarstrom | 202/42 |
| 3,844,898 | 10/1974 | De Graff | 202/158 |
| 4,345,973 | 8/1982 | Ladisch et al. | 203/19 |
| 4,407,662 | 10/1983 | Ginder | 203/19 |
| 4,478,685 | 10/1984 | Mortenson | 202/158 |
| 4,617,093 | 10/1986 | Hwang | 202/158 |
| 4,874,524 | 10/1989 | Liapis et al. | 203/41 |
| 4,906,787 | 3/1990 | Huang et al. | 568/697 |
| 5,324,866 | 6/1994 | Marker et al. | 568/697 |
| 5,395,981 | 3/1995 | Marker | 203/DIG. 6 |
| 5,449,501 | 12/1995 | Luebke et al. | 203/DIG. 6 |

FOREIGN PATENT DOCUMENTS 0561125   7/1958   Canada ................................ 203/41

OTHER PUBLICATIONS

Ming Z; Chun–Jian, X; Guo–Cong, Y. Progress in Natural Science Jun. 1994, vol. 4, No. 5.

*Primary Examiner*—Virginia Manoharan
*Attorney, Agent, or Firm*—Thomas K. McBride; Eugene I. Snyder; Maryann Maas

[57] ABSTRACT

The present invention is a single vessel apparatus for separating at least a first component from a second component of a process stream. The apparatus has a vertically-elongated vessel which contains a plurality of vertically spaced apart distillation contactors for vapor and liquid distillation and an adsorbent-retaining volume defined at least in part by a solids-impermeable member located above the contactors for passing a fluid into the retaining volume. The apparatus also contains a mechanism for adding adsorbent above the solids-impermeable member and a mechanism for withdrawing adsorbent particles from the retaining volume to contact the fluid with adsorbent particles and to provide at least intermittent downward gravity flow of adsorbent particles through the retaining volume and to selectively adsorb a portion of the fluid. The apparatus further contains a regenerator for desorbing fluids from adsorbent particles which is in communication with the mechanism for adding adsorbent above the solids-impermeable member and the means for withdrawing adsorbent particles from the adsorbent-retaining volume. The fluids are desorbed in the regenerator by passing a regenerant into and collecting the regenerant from the regenerator. Finally, the apparatus also contains a mechanism for adding fluid to and withdrawing fluid from the vessel. The benefit of the invention is a high purity single vessel separation unit at reduced capital equipment costs.

8 Claims, 1 Drawing Sheet

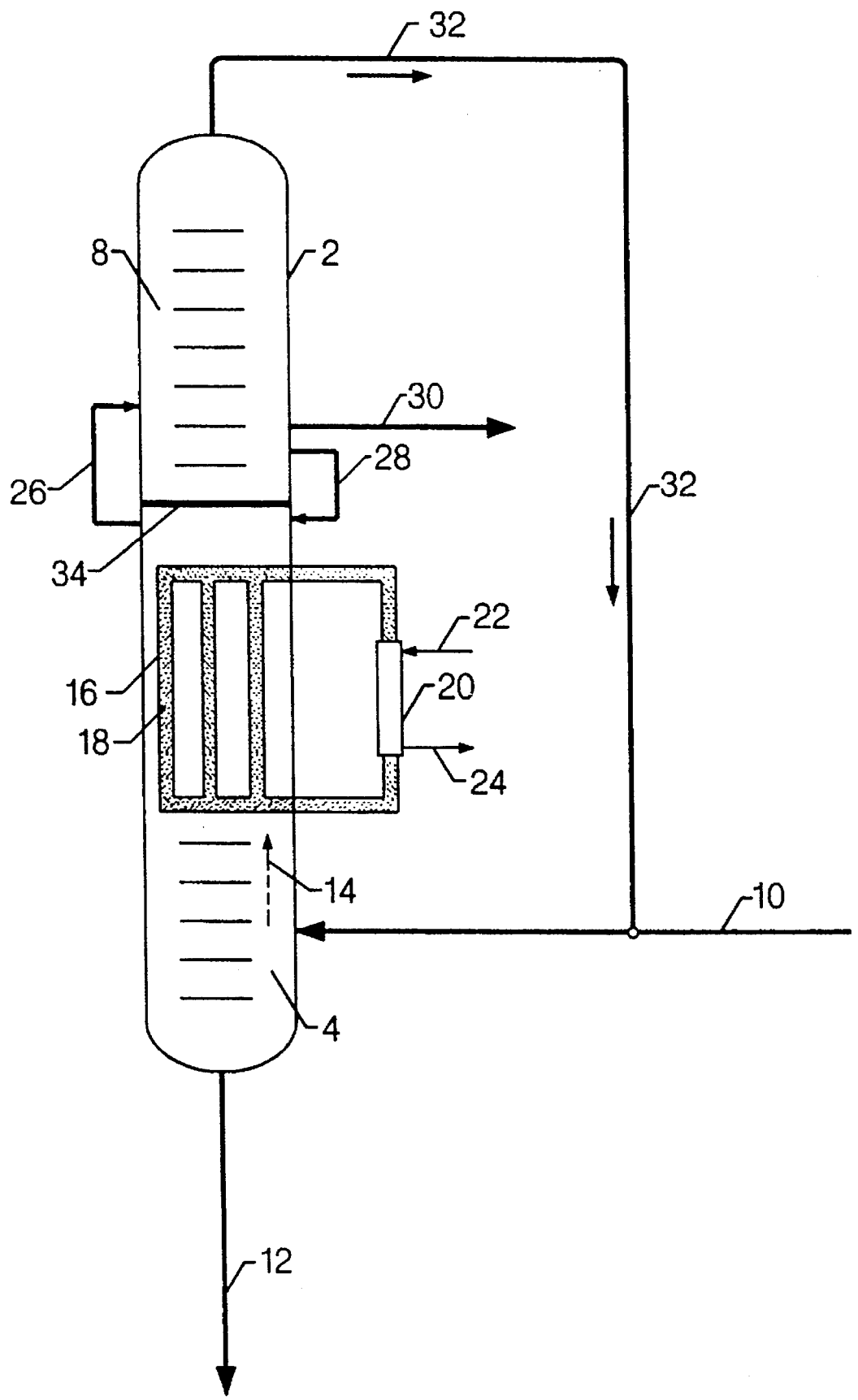

he present invention relates to a single vessel apparatus
SINGLE VESSEL DISTILLATION AND ADSORPTION APPARATUS

FIELD OF THE INVENTION

The present invention relates to a single vessel apparatus for separating a first component and a second component of at least one stream using both distillation and adsorption. More specifically, the present invention is an apparatus having a vertically-elongated vessel which contains a plurality of vertically spaced apart distillation contactors for vapor and liquid distillation, and an adsorbent-retaining volume defined at least in part by a solids-impermeable member located above the contactors for passing a fluid into the retaining volume. The apparatus also contains means for adding adsorbent particles to the retaining volume and means for withdrawing adsorbent particles from the retaining volume to provide at least intermittent downward gravity flow of adsorbent particles through the retaining volume and to contact the fluid with adsorbent particles to selectively adsorb a portion of the fluid. The apparatus further contains a regenerator, for desorbing fluids from adsorbent particles, which is in communication with the means for adding adsorbent particles to the retaining volume and the means for withdrawing adsorbent particles from the adsorbent-retaining volume. The fluids are desorbed in the regenerator by passing a regenerant into and collecting the regenerant from the regenerator. Finally, the apparatus also contains means for adding fluid to and withdrawing fluid from the vessel.

BACKGROUND OF THE INVENTION

In commercial distillations for the separation of one component or a plurality of components from mixtures containing the same, it is often difficult to achieve the desired degree of purity. A leading example of the difficulty of separating one component from another is the separation of a mixture of an alcohol, usually the first component, and water, usually the second component, or separation of an azeotropic mixture of the two. Many approaches have been suggested for processing mixtures and azeotrope-containing streams to achieve the desired separation of one component of the mixture or azeotropic stream from another component. In general, these operations have been relatively expensive and, in many instances, not entirely satisfactory.

U.S. Pat. No. 4,906,787 disclosed a process for producing diisopropyl ether containing negligible levels of alcohol and water contaminants by first hydrating propylene in the presence of an acidic zeolite to produce an aqueous mixture of ether and alcohol. This aqueous mixture was then passed into a distillation unit operated at conditions effective to provide an azeotropic overhead stream containing mostly ether and only minor amounts of alcohol and water. The azeotropic overhead stream was then passed to an alcohol separation unit of an extraction column which used process feedwater as the extraction medium. Due to the extraction of alcohol from the ether-rich phase, the solubility of water in the ether-rich phase is reduced leading to further loss of water from the ether product. U.S. Pat. No. 4,906,787 also taught that the alcohol separation unit may be in the form of a decanter with the condensed azeotropic overhead stream separating into an ether enriched upper phase and an aqueous alcohol enriched lower phase.

U.S. Pat. No. 4,345,973 disclosed the recovery of ethanol from a fermentation broth by distilling a dilute aqueous alcohol to its azeotrope, distilling the azeotropic mixture using a third component of either an organic solvent or a strong salt solution to break the azeotrope and remove the remaining water, and distilling the resulting mixture to separate water from this third component.

U.S. Pat. No. 3,122,486 disclosed a process of using a distillation unit followed by an adsorption unit. An alcohol and water mixture was first separated by distillation into a water stream and an alcohol and water stream. The alcohol and water stream was then introduced to an adsorption unit which contained a molecular sieve or ion exchange resin capable of selectively adsorbing water. As the stream containing isopropanol and water moved through the adsorbent, water was adsorbed and removed, thereby producing a dry alcohol stream. U.S. Pat. No. 3,122,486 also taught the use of a swing bed adsorption system that allowed for one bed to continuously remove water from the distillate while the other bed was being desorbed. The water-saturated adsorbent bed was isolated through using a specific valving arrangement in order to provide suction to the bed, thereby removing water vapor from the bed. Once the pressure in the bed undergoing desorption reaches a predetermined low point, a portion of the dry alcohol product from the other adsorption bed that is undergoing adsorption is passed through the bed for backwashing, thereby preparing the bed undergoing desorption to be switched to adsorption.

The two-stage diisopropyl ether (DIPE) production process disclosed in U.S. Pat. No. 5,324,866 taught that two separation units were required to separate an isopropyl alcohol (IPA) and water mixture, and to separate a DIPE, IPA, and water mixture. The first separation unit was a fractionation unit which separated an IPA and water mixture into a water stream and an IPA stream that also contained some water. The second separation unit was also a fractionation unit, and the IPA and water stream from the first separation unit, plus an IPA, DIPE and water mixture were separated into a substantially DIPE stream and a substantially IPA stream.

Applicants are the first to address the need for a single vessel to separate a first component from a second component, e.g. water and an alcohol, that combines both the physical separation processes of distillation and adsorption. As discussed above, others have proposed processes which use both a distillation unit and an adsorption unit, or two distillation units. But applicants have redefined the economics of such two-unit processes since, with applicants invention, the prior art two-unit systems are no longer necessary, and only applicants' single vessel apparatus is required to carry out the same functions resulting in a significant reduction in capital equipments costs.

SUMMARY OF THE INVENTION

The purpose of the present invention is to provide a single vessel apparatus to separate at least two components using both distillation and adsorption. The apparatus of the invention is a vertically-elongated vessel, a first plurality of vertically spaced apart distillation contactors disposed within the vessel for vapor and liquid distillation, an adsorbent-retaining volume defined at least in part by a solids-impermeable member located in the vessel above the contactors, means for adding adsorbent particles to the adsorbent-retaining volume and means for withdrawing adsorbent particles from the retaining volume to provide at least intermittent downward gravity flow of adsorbent particles through the retaining volume and to contact the fluid with adsorbent particles to selectively adsorb a portion of the fluid, a regenerator for desorbing fluids from adsorbent particles in communication with the means for adding adsorbent particles to the retaining volume and the means for withdrawing adsorbent particles from the retaining volume, means for passing a regenerant into and collecting regenerant from the regenerator, and means for adding fluid to and withdrawing fluid from the vessel. A more specific embodiment of the invention is one where the apparatus also contains a second plurality of vertically spaced apart distillation contactors for vapor and liquid distillation disposed within the vessel above the adsorbent-retaining volume. A still more specific embodiment of the invention is one where the adsorbent-retaining volume is defined at least in part by a plurality of solids-impermeable and vertically-extended conduits in a spaced apart relationship which are located at a common elevation in the vessel and above the plurality of distillation contactors.

BRIEF DESCRIPTION OF THE DRAWING

The FIGURE is a schematic representation of the preferred embodiment of the present invention.

DETAILED DESCRIPTION OF THE INVENTION

The present invention combines the separation techniques of distillation and adsorption in a single vessel. The purpose of the present invention is to provide a means for separating a process stream into a stream containing largely a first component and another stream containing largely a second component. The apparatus is composed of at least four main parts, a vertically-elongated vessel, distillation contactors, an adsorbent volume, and a regenerator. The vertically-elongated vessel may be of the type typically used for distillation operations.

The distillation contactors may be trays or packings to provide at least two theoretical stages of contact to assist in removing a component by fractionation from the process stream. The trays or packings may be of a conventional nature. Such trays or packings are very well known to those skilled in the art and do not require extensive discussion here. The distillation contactors are vertically spaced apart and are preferably horizontally extending. The apparatus of the invention contains at least one collection of distillation contactors and may contain two collections of distillation contactors. The number of contactors in each collection may vary with the use of the apparatus, but there must be at least two contactors in each collection. The distillation contactors may be converted into reactive distillation contactors by disposing catalyst therein. The reactive distillation contactors serve to remove a component by fractionation and to react a component to form a more desirable component.

The adsorbent-retaining volume is for containing adsorbent particles suitable for selectively adsorbing a component from the process stream and is located above the plurality of distillation contactors. Suitable adsorbents include, but are not limited to, molecular sieves and ion exchange resins. The molecular sieve may be a naturally-occurring aluminosilicate, a synthetic aluminosilicate, borosilicate, or gallosilicate. A hydrophilic molecular sieve having pore diameters large enough to adsorb most of the molecular species of the feedstock based on molecular size configurations is preferred, such as the potassium form of zeolite A. Other crystalline microporous materials such as aluminophosphates and silicoaluminophosphates may also be used. Suitable ion exchange resins include Dowex 50 or 50W, Amberlite 120, and the like.

The adsorbent-retaining volume is defined at least in part by a solids-impermeable member and, in a preferred embodiment, the adsorbent-retaining volume is defined by a plurality of solids-impermeable and vertically-extended conduits in a spaced apart relationship which are located at a common elevation in the vessel above the plurality of distillation contactors. In a specific embodiment, the solids-impermeable conduits may be specially designed downcomers made of metal mesh screen which will allow for intimate contact of the adsorbent and the fluid of the process stream such as those disclosed in U.S. Pat. No. 5,108,550 which is herein incorporated by reference. U.S. Pat. No. 5,108,550 discloses a process for concurrent catalytic reaction with distillation where the catalyst is held in liquid permeable containers which extend between distillation devices. Unlike the system disclosed in U.S. Pat. No. 5,108,550, the adsorbent-retaining volume of the present invention is in communication with a regenerator for desorbing fluids from the adsorbent.

Adsorbent particles containing selectively adsorbed fluid components are periodically or continuously removed from the adsorbent-retaining volume and passed to a regenerator located adjacent and external to the vessel. In the regenerator, regenerant is passed over the adsorbent particles to desorb fluids from the adsorbent particles. The regenerant may be a noncondensible purge gas, or the regenerant may be vacuum. In the case where the regenerant is a noncondensible purge gas, the regenerant may be heated prior to being passed over the adsorbent in the regenerator. For example, in one specific embodiment, heated nitrogen is passed into the regenerator whereby the temperature of the adsorbent is increased and adsorbed fluid components become desorbed and are carried out of the regenerator and away from adsorbent particles as part of the purge gas effluent. As an option, the regenerator may be heated to facilitate desorption. The adsorbent is then reintroduced to the adsorbent-retaining volume by adding the adsorbent particles above the solids-impermeable member of the vessel.

The apparatus of the present invention may be applied in many processes, particularly in the hydrocarbon processing area. The process stream to be separated may be any stream which contains a first component and a second component. It is within the scope of the present invention to have either the first or second component or both components made up of a plurality of constituents. For example, the first component may be an alcohol and the second component may be water.

The use of the invention is best explained in terms of the specific application where the stream to be separated is a mixture of isopropyl alcohol and water with the first component being the isopropyl alcohol and the second component being the water and the apparatus of the invention is a vertically-elongated vessel containing a plurality of vertically spaced apart distillation contactors disposed within the vessel for vapor and liquid distillation, an adsorbent-retaining volume defined at least in part by a solids-impermeable member located above the contactors for passing a fluid into the retaining volume, means for adding adsorbent particles to the retaining volume and means for withdrawing adsorbent particles from the retaining volume to provide at least intermittent downward gravity flow of adsorbent particles through the retaining volume and to contact the fluid with adsorbent particles to selectively adsorb a portion of the fluid, a regenerator for desorbing fluids from adsorbent particles in communication with means for adding adsorbent particles to the retaining volume and means for withdrawing adsorbent particles from the retaining volume, means for passing a regenerant into and collecting regenerant from the regenerator, and means for adding fluid to and withdrawing fluid from the vessel. Typically, the isopropyl alcohol and water mixture will be the effluent from an isopropyl alcohol production process, and the water will be present in an excess amount. Commonly expected concentrations are, for example, 82 mass % water and 18 mass % isopropyl alcohol. The present invention, being only a single vessel, significantly reduces both capital costs and operational costs of the separation incurred in separating isopropyl alcohol and water as compared with the two-unit systems, usually an azeotrope column and a distillation column, currently used in industry.

The stream containing the isopropyl alcohol and water mixture is introduced into the portion of the vessel containing the distillation contactors where a majority of the water is easily separated by fractionation using the distillation contactors and removed from the isopropyl alcohol in a distillation bottoms stream due to the difference in boiling points of the water and the alcohol. As the concentration of water in the mixture decreases, an azeotrope of 88 mass % isopropyl alcohol and 12 mass % water will form and additional water will not be separated from the azeotrope through distillation. The azeotrope of the distillation overhead stream then encounters the adsorbent-retaining volume defined by a solids-impermeable membrane. The adsorbent-retaining volume contains an adsorbent capable of selectively removing water from the distillation overhead stream. A portion of the water present in the distillation overhead stream is adsorbed from the distillation overhead stream causing the concentration of water in the adsorbent overhead stream to fall below that required to maintain the azeotrope. In this embodiment of the invention, the adsorbent particles are chosen so that sufficient water is removed to result in an adsorbent overhead stream containing at least 98 mass % isopropyl alcohol which is then removed from the vessel and collected. The adsorbent is continuously being removed from the adsorbent-retaining volume and carried to the regenerator where heated nitrogen is passed over the adsorbent to desorb water. The adsorbent, now substantially free of water is reintroduced to the adsorbent-retaining volume by adding the adsorbent to the vessel above the solids-impermeable member.

Removing sufficient water to provide a stream of at least 98 mass % isopropyl alcohol may be difficult, so another embodiment of the invention is one where only a portion of the water available is removed by the adsorbent, and a second set of distillation contactors are employed above the adsorbent-retaining volume to separate any alcohol and water azeotrope from the alcohol. For this embodiment, the apparatus of the invention is as described above with the addition of a second plurality of vertically spaced apart distillation contactors disposed within the vessel for vapor and liquid distillation positioned above the adsorbent-retaining volume.

In general terms, using this embodiment involves (1) introducing a process stream to the lower portion of the vessel and distilling the process stream, using the distillation contactors, into a first distillation overhead stream enriched in a first component and a first distillation bottoms stream enriched in a second component; (2) conducting the first distillation overhead stream to the adsorbent-retaining volume to contact the adsorbent capable of selectively removing a portion of the second component from the first distillation overhead stream to afford an adsorbent overhead stream which is depleted in the second component; (3) passing the adsorbent overhead stream to the second plurality of distillation contactors and distilling, using the distillation contactors, to form a second distillation bottoms stream containing at least 98 mass % first component and a second distillation overhead stream; (4) withdrawing and collecting the second distillation bottoms stream from the vessel; and (5) continuously removing adsorbent from the adsorbent-retaining volume and desorbing water from the adsorbent in the regenerator.

As applied to the specific embodiment where the stream to be separated is a mixture of isopropyl alcohol and water with the first component being the alcohol and the second component being the water, the use of the invention would proceed as follows. The stream containing the isopropyl alcohol and water mixture is introduced into the portion of the vessel containing the first plurality of distillation contactors where a majority of the water is easily separated and removed from the isopropyl alcohol in a first distillation bottoms stream due to the difference in boiling points of the water and the alcohol. As the concentration of water in the mixture decreases, an azeotrope of 88 mass % isopropyl alcohol and 12 mass % water will form, and additional water will not be separated from the azeotrope by distillation. The first distillation overhead stream then enters the adsorbent-retaining volume and contacts an adsorbent which selectively adsorbs additional water causing the concentration of water to fall below that required to maintain the azeotrope. The adsorbent is chosen and controlled so that only a portion of the available water is removed resulting in an adsorbent overhead stream requiring further distillation. The water-depleted adsorbent overhead stream is then introduced to the portion of the vessel containing the second plurality of distillation contactors where isopropyl alcohol may be separated from the isopropyl alcohol and water azeotrope that reforms with the removal of isopropyl alcohol due to the slight yet sufficient difference in the boiling points of the alcohol and the azeotrope. A second distillation bottoms stream of at least 98 mass % isopropyl alcohol may be removed from the vessel and collected, and the second distillation overhead stream containing the azeotrope may be recycled to the portion of the vessel containing the first plurality of distillation contactors. The adsorbent is continuously being removed from the adsorbent-retaining volume, and water is desorbed from the adsorbent in the regenerator before the adsorbent is returned to the adsorbent-retaining volume by adding the adsorbent to the vessel above the solids-impermeable member.

Applicant has found that with the embodiment having two pluralities of distillation contactors in the vessel, it is preferred that the vessel also have a fluid impermeable barrier above the adsorbent-retaining volume and below the second plurality of distillation contactors that divides the vessel into an upper portion and a lower portion. The adsorbent overhead stream is directed in a line external or internal to the vessel and is introduced to the upper portion of the vessel containing the second plurality of distillation connectors at least a short distance above the first distillation contactor. For example, when the distillation contactors are comprised of a series of trays, the adsorbent overhead stream should be introduced at least two trays into the upper portion of the vessel above the fluid impermeable barrier. The stream containing substantially the first component is withdrawn from the upper portion of the vessel in the segment of the upper portion after the beginning of the upper portion and before the introduction of the adsorbent overhead stream.

Since the adsorbent overhead stream is introduced at a point after the withdrawal of the first component stream, there is less opportunity for mixing, and the concentration of the first component in the first component stream is higher. Of course, a conduit allowing for non-removed liquid to pass to the adsorbent-retaining volume may be provided.

The apparatus of the present invention may also be applied to two-stage diisopropyl ether processes to assist in breaking the isopropyl alcohol-water azeotrope that is formed during the production of diisopropyl ether. In the first stage of the two-stage diisopropyl ether process, a propylene-containing stream is passed to a first stage diisopropyl ether formation reactor and the propylene is reacted with recycled isopropyl alcohol to form diisopropyl ether in the presence of an etherification catalyst.

The propylene-containing stream can include, but is not limited to, gas plant off-gas containing propylene, naphtha cracker off-gas containing light olefins, and refinery fluidized catalytic cracked (FCC) propane/propylene streams. The concentration of propylene used will vary depending upon the source of the propylene. These sources provide a propylene/propane mixture comprising about 60 to about 80 vol. % propylene. In a preferred embodiment, the propylene concentration of the propylene-containing stream is less than about 70 vol. %.

The etherification catalyst can be any catalyst suitable for propylene conversion. Suitable etherification catalysts include zeolites and ion exchange resins. With respect to zeolites, both intermediate and large pore zeolites can be used. Of particular interest for use herein are large pore acidic zeolites, e.g. zeolite Beta, X, L, Y, ultra stable Y, rare earth Y, ZSM-3, ZSM-4, ZSM-12, ZSM-20, and ZSM-50. With respect to the ion exchange resin, a synthetic ion exchange resin is preferred. The preferred ion exchange resin has three components: (1) the raw material which is used for the construction of the skeleton or matrix; (2) bridging agents for cross-linking and insolubilization; and (3) the type and number of functional active groups. With respect to forming the ion exchange resin matrix, polymerization and polycondensation can be used as the synthesis route. Polymerization is preferred because the matrices resulting therefrom generally have higher chemical and thermal stability. The preferred starting material for synthesizing the catalyst of the present invention is styrene. The styrene is polymerized with itself and with divinylbenzene into a polymeric molecule:

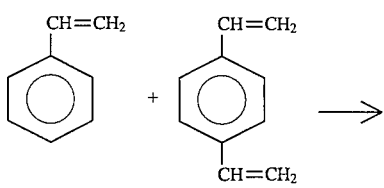

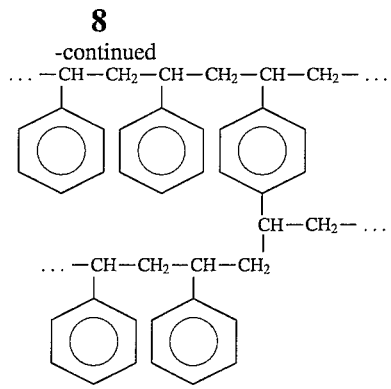

Matrices for the catalyst of the present invention can also be prepared using: (1) a divinylbenzene and an acrylic acid or methacrylic acid or;

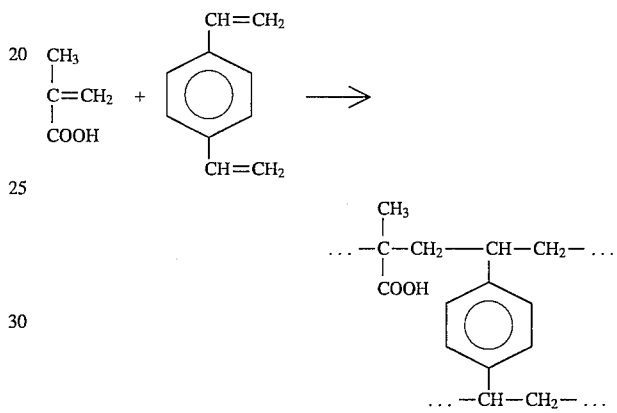

(2) phenol and formaldehyde;

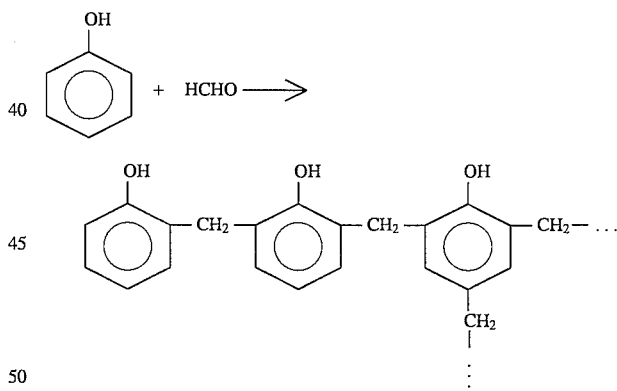

In the case of divinylbenzene-containing matrices, crosslinking depends on the quantity of divinylbenzene used as the crosslinking agent. The nature and degree of crosslinking can have a profound effect on the ion exchange properties of the catalyst. The amount of divinylbenzene used can range from about 2 to about 12 wt. %. With respect to the structure of the network of synthetic ion exchange resins, different types are now available with designations such as gel and macroporous ion exchange resins. With respect to gel-type ion exchange resins, during polymerization of styrene and divinylbenzene, the network formed is obtained as a gel. The properties of such a co-polymer can be varied by changing the ratios of the amounts of the individual monomers used during the synthesis. These gel-type polymer structures have no appreciable porosity until they are swollen in suitable medium, but such crosslinked polymers swell to a well-defined and reproducible degree in an appropriate solvent system, such as toluene. Macroporous ion exchange resins are types in which a solvent is used during production from the monomers so that a porous matrix structure is formed in the course of polymerization. The ion exchange resins may be crosslinked and the pore size modified in a way to obtain polymers with a substantially uniform pore size.

It is preferred that the first stage diisopropyl ether formation catalyst is a cation exchange resin comprising $SO_3H$ groups. Suitable cation exchange resins include, for example, sulfonated organic resins in their acidic form. Of particular importance are sulfonated polystyrene resins such as the $SO_3H$ groups containing co-polymers of aromatic monovinyl compounds and aromatic polyvinyl compounds. Especially preferred cation exchange resins are surfonated styrene/divinylbenzene co-polymers, for example, "Amberlyst 36." These cation exchange resins are produced by the surfonation of suspension co-polymer beads with surfuric acid, sulfur trioxide, fuming sulfuric acid or chlorosulfonic acid. The $SO_3$ groups which are the ionic groups yielding the cation exchange function can be in the para position.

The etherification catalyst can have a surface area Of about I to about 100 $m^2/g$, preferably approximately 35 and a porosity of about 0.05 to about 0.5 ml/g, preferably about 0.30 ml/g.

Suitable conditions for the first stage diisopropyl ether formation reactor include a temperature of about 200 to about 300° F., a pressure of about 100 to about 1200 psi, preferably about 700 to about 1000 psi, and an isopropyl alcohol to propylene ratio of about 0.1:1 to about 2:1, preferably about 0.6:1.

In the first stage reactor, etherification can be carried out under liquid phase, vapor phase or mixed vapor-liquid phase conditions in a batch or continuous manner. With respect to the first stage diisopropyl ether formation reactor, a stirred tank reactor or fixed bed reactor can be employed. The flow of reactants and products can be liquid-upflow, liquid-downflow, countercurrent, or cocurrent, a liquid hourly space velocity of about 0.1 to about 20, preferably about 0.1 to about 2 when operating in the continuous mode. In a preferred embodiment, the single stage reactor can be a liquid phase fixed-bed reactor with recirculation of cooled etherification means effluent for temperature control.

An effluent containing diisopropyl ether, isopropyl alcohol, propylene and propane from the first stage diisopropyl ether formation reactor is passed to a light ends recovery unit where propylene and propane are removed. Effluent from the light ends recovery unit is passed to a water wash tower where isopropyl alcohol is removed to produce an extract comprising residual isopropyl alcohol and water and a raffinate stream comprising a diisopropyl ether product stream.

Regardless of whether the first stage effluent stream is treated to remove light ends or residual isopropyl alcohol, at least a portion of the diisopropyl ether product stream is passed to a second stage isopropyl alcohol formation reactor where diisopropyl ether is reacted with water in the presence of a hydration catalyst under conditions sufficient to produce a second stage effluent stream comprising isopropyl alcohol, water and a small amount of diisopropyl ether.

The hydration catalyst suitable for use in the isopropyl alcohol formation reactor is the same as the etherification catalyst described above, although a catalyst which is more suitable for reaction with high levels of water and at increased temperatures is preferred. Suitable conditions for the isopropyl alcohol formation reactor include a temperature of about 250 to about 350° F., a pressure of about 100 to about 500 psig, preferably about 300 to about 400 psig, and a water to diisopropyl ether ratio of about 1:1 to about 50:1, preferably about 10:1.

In the isopropyl alcohol formation reactor, hydration of diisopropyl ether can be carried out under liquid phase, vapor phase or mixed vapor-liquid phase conditions in a batch or continuous manner. Further, with respect to the isopropyl alcohol formation reactor, a stirred tank reactor or fixed bed reactor can be employed. The flow of reactants and products can be trickle-bed, liquid-upflow, liquid-downflow, countercurrent, or cocurrent having a liquid hourly space velocity of about 0.05 to about 20, preferably about 0.1 to about 2 when operating in the continuous mode.

The effluent stream from the isopropyl alcohol formation reactor and the extract from the water wash column are both passed to the apparatus of the present invention to separate alcohol from water. The apparatus of the present invention consists of a vertically-elongated vessel containing a first plurality of distillation contactors, an adsorbent-retaining volume positioned above the first plurality of distillation contactors and a second plurality of distillation contactors positioned above the adsorbent-retaining volume. The streams are introduced into the portion of the vessel containing the first plurality of distillation contactors where a majority of the water is easily separated and removed from the isopropyl alcohol in a first distillation bottoms stream due to the difference in boiling points of the water and the alcohol. As the concentration of water in the mixture decreases, an azeotrope of 88 mass % isopropyl alcohol and 12 mass % water will form, and additional water will not be separated from the azeotrope by distillation.

The first distillation overhead stream then encounters the adsorbent-retaining volume and contacts an adsorbent which selectively adsorbs additional water causing the concentration of water to fall below that required to maintain the azeotrope. The adsorbent is chosen and controlled so that only a portion of the available water is removed, resulting in an adsorbent overhead stream requiring further distillation. The adsorbent is continuously regenerated using a regenerator which is positioned external to the vessel and is in fluid communication with the adsorbent-retaining volume. In the regenerator a noncondensible gas is passed into contact with spent adsorbent to desorb the water. Substantially water-free adsorbent particles exit the top of the regenerator and are passed to the adsorbent-retaining volume for reuse in adsorbing water from the first distillation overhead stream.

An adsorbent overhead stream exits the adsorbent-retaining volume and enters the second plurality of distillation contactors. The second plurality of distillation contactors separates the adsorbent overhead stream into a second distillation overhead stream containing a water and alcohol azeotrope and a second distillation bottoms stream having an isopropyl alcohol concentration of at least about 98 mass %. The second distillation overhead stream is recycled to the first plurality of distillation contactors and the second distillation bottoms stream containing a substantial amount of the isopropyl alcohol is recycled to the diisopropyl ether formation reactor.

The figure is a schematic representation of one embodiment of the apparatus of the present invention. The apparatus consists of vertically-elongated vessel 2 containing three major operating parts: (1) first plurality distillation contactors 4; (2) adsorbent-retaining volume 18 in fluid communication with and positioned above first plurality distillation contactors 4; (3) and second plurality of distillation contactors 8 in fluid communication with and positioned above adsorbent-retaining volume 18. Referring to the figure, an effluent from a diisopropyl ether production process (not shown) containing a mixture of 50% isopropyl alcohol and 50% water is fed to first plurality of distillation contactors 4 via line 10. A majority of the water, with its higher boiling point, is easily separated from the isopropyl alcohol and is withdrawn in line 12 as a first distillation bottoms stream having a water concentration of about 99 mass %. Exiting the top of first plurality of distillation contactors 4 is a first distillation overhead stream which is shown by internal stream dotted line 14. Stream 14 is an azeotropic mixture of isopropyl alcohol and water having a composition of 88 mass % alcohol and 12 mass % water.

Adsorbent-retaining volume 18 is defined by downcomer arrangements 16 which consist of solids-impermeable mesh screen conduits which contain a molecular sieve adsorbent capable of selectively adsorbing water from stream 14 disposed therein. The purpose of such an arrangement is to allow for intimate contact between the adsorbent and water, thus allowing for selective adsorption of water from isopropyl alcohol.

In fluid communication with downcomer arrangement 16 and external to vessel 2 is regenerator 20. Spent molecular sieve adsorbent is continuously removed from adsorbent-retaining volume 18 via downcomer arrangement 16 and passed through regenerator 20 wherein the water adsorbed on the adsorbent particles is desorbed by passing nitrogen, heated up to about 500° F., into regenerator 20 via line 22 and removing a vapor mixture of water and nitrogen from regenerator 20 through line 24. Once the adsorption capacity of the molecular sieve adsorbent is restored, the adsorbent is passed from regenerator 20 back to adsorbent-retaining volume 18 to continue to adsorb water from stream 14.

An adsorbent overhead stream 26 having a mixture of about 94 mass % isopropyl alcohol and about 6 mass % water exits the top of adsorbent-retaining volume 18 passing the impermeable barrier 34 and enters the second plurality of distillation contactors 8. Line 26 introduces the stream at a point at least two trays from impermeable barrier 34. In second plurality of distillation contactors 8, isopropyl alcohol continues to be separated from the mixture by fractionation, and as the concentration of isopropyl alcohol in the mixture decreases, the isopropyl alcohol-water azeotrope is once again formed. A stream of at least 98 mass % isopropyl alcohol is removed from vessel 2 in line 30. Note that the point at which the 98 mass % isopropyl alcohol stream is removed is between the impermeable barrier 34 and the introduction of line 26. The isopropyl alcohol-water azeotrope is removed from the vessel 2 in line 32 and may be recycled to combine with line 10. Line 28 is provided to allow excess liquid to pass to adsorbent-retaining volume 18.

What is claimed is:

1. A single vessel distillation and adsorption apparatus comprising:

(a) a vertically-elongated vessel;

(b) a first plurality of vertically spaced apart distillation contactors disposed within said vessel for vapor and liquid distillation;

(c) an adsorbent-retaining means, in fluid communication with said first plurality of distillation contactors defined at least in part by a plurality of solids-impermeable and vertically-extended conduits, located at a common elevation in said vessel above said first plurality of distillation contactors in a spaced apart relationship;

(d) means for adding adsorbent particles to an upper portion of said vertically-extended conduits and means for withdrawing adsorbent particles from a lower portion of said vertically extended Conduits to provide at least intermittent downward gravity flow of adsorbent particles through said retaining means and to contact said fluid with adsorbent particles to selectively adsorb a portion of said fluid;

(e) a second plurality of vertically spaced apart distillation contactors disposed within said vessel for vapor and liquid distillation located above said retaining means in fluid communication with said retaining means;

(f) a regenerator for desorbing fluids from adsorbent particles in communication with the means for adding adsorbent particles and the means for withdrawing adsorbent particles from said retaining means;

(g) means for passing regenerant into and collecting regenerant from said regenerator; and (h) means for adding fluid to and withdrawing fluid from said vessel.

2. The apparatus of claim 1 further comprising means for heating said regenerator.

3. The apparatus of claim 1 further comprising means for heating the regenerant.

4. The apparatus of claim 1 further comprising a fluid impermeable barrier within the vertically-elongated vessel located above said vertically-extended conduits and below the second plurality of distillation contactors and a contactor conduit to communicate effluent from above the adsorbent-retaining means past said fluid impermeable barrier to said second plurality of distillation contactors.

5. The apparatus of claim 1 wherein at least one plurality of vertically spaced apart distillation contactors further contains a catalyst for reactive distillation.

6. A single vessel distillation and adsorption apparatus comprising:

a. a vertically-elongated vessel;

b. a first plurality of vertically spaced apart distillation contactors disposed within said vessel for vapor and liquid distillation;

c. an adsorbent-retaining means, in fluid communication with said first plurality of distillation contactors and defined at least in part by a solids-impermeable member, located in said vessel above said contactors;

d. means for adding adsorbent particles to said adsorbent-retaining means and means for withdrawing adsorbent particles from said retaining means to provide at least intermittent downward gravity flow of adsorbent particles through said retaining means and to contact a fluid with adsorbent particles to selectively adsorb a portion of said fluid;

e. a second plurality of vertically spaced apart distillation contactors disposed within said vessel for vapor and liquid distillation located above said retaining means in fluid communication with said retaining means;

f. a regenerator for desorbing fluids from adsorbent particles in communication with said means for adding adsorbent particles and means for withdrawing adsorbent particles from said retaining means;

g. means for passing a regenerant into and collecting regenerant from said regenerator; and h. means for adding fluid to and withdrawing fluid from said vessel.

7. The apparatus of claim 6 further comprising a fluid impermeable barrier dividing the vessel into an upper portion and a lower portion where said lower portion contains the first plurality of vertically spaced apart distillation contactors and the adsorbent-retaining means, and the upper portion contains the second plurality of vertically spaced apart distillation contactors, and a conduit to communicate effluent from above the adsorbent-retaining means past said impermeable flow barrier to the second plurality of vertically spaced apart distillation contactors located in said upper portion of the vessel.

8. A single vessel distillation and adsorption apparatus comprising:

a. a vertically-elongated vessel;

b. a plurality of vertically spaced apart distillation contactors containing a catalyst for reactive distillation disposed within said vessel for vapor and liquid distillation;

c. an adsorbent-retaining means, in fluid communication with said contactors and defined at least in part by a solids-impermeable member, located in said vessel above said contactors;

d. means for adding adsorbent particles to said adsorbent-retaining means and means for withdrawing adsorbent particles from said retaining means to provide at least intermittent downward gravity flow of adsorbent particles through said retaining means and to contact a fluid with adsorbent particles to selectively adsorb a portion of said fluid;

e. a regenerator for desorbing fluids from adsorbent particles in communication with said means for adding adsorbent particles and means for withdrawing adsorbent particles from said retaining means;

f. means for passing a regenerant into and collecting regenerant from said regenerator; and g. means for adding fluid to and withdrawing fluid from said vessel.

* * * * *